US012157097B2

(12) United States Patent
Tian et al.

(10) Patent No.: US 12,157,097 B2
(45) Date of Patent: Dec. 3, 2024

(54) FULLY ELECTRIC-DRIVE SAND-MIXING APPARATUS, AND AUTOMATIC CONTROL SYSTEM FOR FULLY ELECTRIC-DRIVE SAND-MIXING APPARATUS

(71) Applicant: Sichuan Honghua Petroleum Equipment Co., Ltd, Sichuan (CN)

(72) Inventors: Yu Tian, Sichuan (CN); Hongshan Li, Sichuan (CN); Dalang Ge, Sichuan (CN); Bo Liu, Sichuan (CN); Shuihua Li, Sichuan (CN)

(73) Assignee: SICHUAN HONGHUA PETROLEUM EQUIPMENT CO., LTD, Sichuan (CN)

( * ) Notice: Subject to any disclaimer, the term of this patent is extended or adjusted under 35 U.S.C. 154(b) by 578 days.

(21) Appl. No.: 17/614,509

(22) PCT Filed: May 27, 2020

(86) PCT No.: PCT/CN2020/092445
§ 371 (c)(1),
(2) Date: Nov. 26, 2021

(87) PCT Pub. No.: WO2020/238920
PCT Pub. Date: Dec. 3, 2020

(65) Prior Publication Data
US 2022/0219129 A1 Jul. 14, 2022

(30) Foreign Application Priority Data
May 28, 2019 (CN) ........................ 201910450747.X

(51) Int. Cl.
*B01F 23/00* (2022.01)
*B01F 23/50* (2022.01)
(Continued)

(52) U.S. Cl.
CPC .......... *B01F 23/59* (2022.01); *B01F 33/5026* (2022.01); *B01F 35/187* (2022.01);
(Continued)

(58) Field of Classification Search
CPC .. B01F 2101/49; B01F 23/59; B01F 35/7176; B01F 35/883; B01F 35/2209;
(Continued)

(56) References Cited

U.S. PATENT DOCUMENTS

2019/0009232 A1* 1/2019 Yeung .................. B01F 35/2144
2020/0199990 A1* 6/2020 Friesen ............. B01F 35/71705
2020/0290000 A1* 9/2020 Whitlatch ............. E21B 21/062

* cited by examiner

*Primary Examiner* — Anshu Bhatia

(57) ABSTRACT

A fully electric-drive sand-mixing apparatus comprises a foundation; and a suction pump, a suction pump driving electric motor, a suction manifold, a mixing stirrer, a mixing stirrer driving electric motor, a dry-ingredient-adding device, a dry-ingredient-adding device driving electric motor, a liquid-adding device, a liquid-adding device driving electric motor, a sand-conveying device, a sand-conveying device driving electric motor, a discharge pump, a discharge pump driving electric motor, a discharge manifold, a frequency converter placement room and an operation room, which are fixedly connected to the foundation. The suction pump driving electric motor, the mixing stirrer driving electric motor, the dry-ingredient-adding device driving electric motor, the liquid-adding device driving electric motor, the sand-conveying device driving electric motor and the discharge pump driving electric motor are fixedly and electrically connected to the suction pump, the mixing stirrer, the dry-ingredient-adding device, the liquid-adding device, the sand-conveying device and the discharge pump, respectively.

15 Claims, 12 Drawing Sheets

(51) Int. Cl.

| | |
|---|---|
| ***B01F 33/502*** | (2022.01) |
| ***B01F 35/00*** | (2022.01) |
| ***B01F 35/21*** | (2022.01) |
| ***B01F 35/22*** | (2022.01) |
| ***B01F 35/71*** | (2022.01) |
| ***B01F 35/75*** | (2022.01) |
| ***B01F 35/88*** | (2022.01) |
| ***E21B 43/26*** | (2006.01) |
| *B01F 101/49* | (2022.01) |

(52) U.S. Cl.
CPC ...... *B01F 35/2112* (2022.01); *B01F 35/2209* (2022.01); *B01F 35/7173* (2022.01); *B01F 35/7176* (2022.01); *B01F 35/718* (2022.01); *B01F 35/71815* (2022.01); *B01F 35/7544* (2022.01); *B01F 35/883* (2022.01); *E21B 43/2607* (2020.05); *B01F 2101/49* (2022.01)

(58) Field of Classification Search
CPC ................ B01F 35/7173; B01F 35/187; B01F 35/7544; B01F 35/718; B01F 35/2112; B01F 33/5026; B01F 35/71815
See application file for complete search history.

FULLY ELECTRIC-DRIVE SAND-MIXING APPARATUS, AND AUTOMATIC CONTROL SYSTEM FOR FULLY ELECTRIC-DRIVE SAND-MIXING APPARATUS

CROSS REFERENCE OF RELATED APPLICATION

The application claims the priority of Chinese Patent Application CN201910450747.X, titled "Fully electric-drive sand mixer and automatic control system therefor", filed with the China National Intellectual Property Administration (CNIPA) on May 28, 2019, the entire content of which is incorporated hereby by reference.

BACKGROUND OF THE PRESENT INVENTION

Field of Invention

The present invention relates to the technical field of oil drilling equipment, and more particularly to a fully electric-drive sand mixer for fracturing equipment, and an automatic control system therefor.

Description of Related Arts

As the core equipment of fracturing construction equipment, sand mixer is widely used in the construction process of oil and gas production. Sand mixer is the main supporting equipment for oil field fracturing and sand proof operations, which is mainly used for mixing, stirring, and conveying sand liquid and other media required for fracturing operations. The conventional sand mixing skid is generally driven by two diesel engines or electro-hydraulic hybrid. Neither of these drive forms can get rid of the hydraulic drive. The hydraulic drive transmits the power to each oil pump through the transmission system to respectively drive the oil motors in the mechanisms, thereby driving the suction liquid supply pump, sand conveying auger, dry adding motor, liquid adding pump, sand discharge pump, mixing tank motor, fan, etc. The control system of the sand mixer mainly controls the displacement of the suction pump and the discharge pump, as well as controls the liquid level of the sand mixing tank, which adopts a complicated hydraulic drive control process, leading to high operation requirements. For a conventional electro-hydraulic-drive sand mixer, the components thereof are arranged as follows. The frequency converter room and the operation room are integrated and are together fixed on the upper layer of the sand mixer, while the suction pump, the discharge pump, the dry adding device, the liquid adding equipment and various manifolds are all arranged under the frequency converter room and the operation room.

The prior art has the following problems:

1. The conventional hydraulic drive form adopts a complicated structure and is difficult to maintain.
2. The conventional hydraulic drive process is complicated.
3. In the conventional hydraulic drive process, the hydraulic oil needs to be replaced regularly, and a heat sink is necessary, which cause defects such as high failure rate, large noise, large emissions, high energy consumption, hydraulic oil leakage, and high operating costs.
4. Due to the layout of the equipment in the prior art, the frequency converter room and the operation room are difficult to disassemble, and it is very inconvenient for the maintenance personnel to climb in and out from the lower layer while repairing the suction pump, discharge pump, dry adding device, liquid adding equipment and various manifolds.
5. The prior art adopts hydraulic drive, so the response speed and control accuracy are poor.
6. The prior art adopts hydraulic drive, so there is very loud noise during construction, and it is impossible to construct at night.

In order to solve the above problems, it is necessary to provide a fully electric-drive sand mixer suitable for fracturing construction, as well as an automatic control system therefor.

SUMMARY OF THE PRESENT INVENTION

To overcome the above-mentioned shortcomings in the prior art, an object of the present invention is to provide a fully electric-drive sand mixer with improved response speed and control accuracy, and provide an automatic control system for controlling the fully electric-drive sand mixer.

Accordingly, in order to accomplish the above objects, the present invention provides the following technical solution:

a fully electric-drive sand mixer, comprising: a foundation which is divided into an upper foundation layer and a lower foundation layer;

a suction pump which is fixed to the lower foundation layer;

a suction pump driving motor which is fixed and electrically connected to the suction pump, wherein a bottom of the suction pump driving motor is fixed to the lower foundation layer;

a suction manifold which is fixed to the lower foundation layer, wherein one end of the suction manifold is fixed and communicates with one end of the suction pump;

a mixing agitator which communicates with the other end of the suction manifold, wherein the mixing agitator is fixed to both the upper foundation layer and the lower foundation layer;

a mixing agitator driving motor which is fixed to a top of the mixing agitator, wherein the mixing agitator driving motor is electrically connected to the mixing agitator;

a dry adding device which is fixed to the upper foundation layer, wherein the dry adding device communicates with the mixing agitator, and a quantity of the dry adding device is M, and M≥1;

a dry adding device driving motor which is fixed and electrically connected to the dry adding device, wherein a quantity of the dry adding device driving motor is equal to the quantity of the dry adding device;

a liquid adding device which is fixed to the lower foundation layer, wherein the liquid adding device communicates with the mixing agitator, and a quantity of the liquid adding device is N, and N≥1;

a liquid adding device driving motor which is fixed and electrically connected to the liquid adding device, wherein a bottom of the liquid adding device driving motor is fixed to the lower foundation layer, and a quantity of the liquid adding device driving motor is equal to the quantity of the liquid adding device;

a sand conveying device which is fixed to both the upper foundation layer and the lower foundation layer, wherein the electric sand conveying device is inclined with reference to a foundation plate, and the sand conveying device communicates with the mixing agitator;

a sand conveying device driving motor which is fixed and electrically connected to a top of the sand conveying device;

a discharge pump which is fixed to the lower foundation layer, wherein the discharge pump communicates with the mixing agitator;

a discharge pump driving motor which is fixed and electrically connected to the discharge pump, wherein the discharge pump driving motor is also fixed to the lower foundation layer;

a discharge manifold, wherein one end of the discharge manifold is fixed and communicates with the discharge pump, and also communicates with the mixing agitator; the discharge manifold is fixed to the lower foundation layer; and an operation room which is fixed to the upper foundation layer.

Preferably, the sand conveying device is fixedly installed at one end of the foundation; L pieces of the foundation plates are provided on the upper foundation layer, where L≥2; the foundation plates are detachable; the mixing agitator is installed just next to the sand conveying device; the top of the mixing agitator is fixed to the upper foundation layer, and a bottom of the mixing agitator is fixed to the lower foundation layer; the discharge pump, the discharge pump driving motor, the discharge manifold, the suction pump, the suction pump driving motor, the suction manifold, the liquid adding device, and the liquid adding device driving motor are all fixed to the lower foundation layer, and are all arranged between the upper foundation layer and the lower foundation layer; the operation room is fixedly installed on the upper foundation layer and is located above the discharge pump, the discharge pump driving motor, the discharge manifold, the suction pump, the suction pump driving motor, the suction manifold, the liquid adding device, and the liquid adding device driving motor. In a case that it is required to maintain or replace the discharge pump, the discharge pump driving motor, the discharge manifold, the suction pump, the suction pump driving motor, the suction manifold, the liquid adding device, and the liquid adding device driving motor, the foundation plates can be removed for operation, which is convenient for the operators since, and there is no need to carry out large-scale dismantling and installation work.

Preferably, the fully electric-drive sand mixer further comprises a frequency converter room which is installed in any one of the following two forms:

A, the frequency converter room is fixedly installed at the other end of the foundation, and is fixed to the lower foundation layer; or B, the frequency converter room is independent as a skid.

Preferably, the suction pump driving motor, the mixing agitator driving motor, the liquid adding device driving motor, the dry adding device driving motor, the sand conveying device driving motor and the discharge pump driving motor are configured in any one of the following six forms:

C, the suction pump driving motor, the mixing agitator driving motor, the liquid adding device driving motor, the dry adding device driving motor, the sand conveying device driving motor and the discharge pump driving motor are all connected to and integrated with a frequency converter;

D, the suction pump driving motor, the mixing agitator driving motor, the liquid adding device driving motor, the dry adding device driving motor, the sand conveying device driving motor and the discharge pump driving motor are all connected to and integrated with a frequency converter; and a regulating valve is provided on the suction manifold;

E, the mixing agitator driving motor, the liquid adding device driving motor, the dry adding device driving motor and the sand conveying device driving motor are all connected to and integrated with a frequency converter; the suction pump driving motor and the discharge pump driving motor are both rated speed driving motors; and a regulating valve is provided on the suction manifold;

F, the suction pump driving motor, the mixing agitator driving motor, the liquid adding device driving motor, the dry adding device driving motor and the sand conveying device driving motor are all connected to and integrated with a frequency converter; and the discharge pump driving motor is a rated speed driving motor;

G, the suction pump driving motor, the mixing agitator driving motor, the liquid adding device driving motor, the dry adding device driving motor and the sand conveying device driving motor are all connected to and integrated with a frequency converter; the discharge pump driving motor is a rated speed driving motor; and a regulating valve is provided on the suction manifold; or H, the mixing agitator driving motor, the liquid adding device driving motor, the dry adding device driving motor, the sand conveying device driving motor and the discharge pump driving motor are all connected to and integrated with a frequency converter; the suction pump driving motor is a rated speed driving motor; and a regulating valve is provided on the suction manifold.

Preferably, the suction pump driving motor, the mixing agitator driving motor, the liquid adding device driving motor, the dry adding device driving motor, the sand conveying device driving motor and the discharge pump driving motor are configured in any one of the following six forms:

I, the suction pump driving motor, the mixing agitator driving motor, the liquid adding device driving motor, the dry adding device driving motor, the sand conveying device driving motor and the discharge pump driving motor are all connected to a frequency converter, and the frequency converter is fixedly installed in the frequency converter room;

J, the suction pump driving motor, the mixing agitator driving motor, the liquid adding device driving motor, the dry adding device driving motor, the sand conveying device driving motor and the discharge pump driving motor are all connected to a frequency converter, and the frequency converter is fixedly installed in the frequency converter room; and a regulating valve is provided on the suction manifold;

K, the mixing agitator driving motor, the liquid adding device driving motor, the dry adding device driving motor and the sand conveying device driving motor are all connected to a frequency converter, and the frequency converter is fixedly installed in the frequency converter room; the suction pump driving motor and the discharge pump driving motor are both rated speed driving motors; and a regulating valve is provided on the suction manifold;

P, the suction pump driving motor, the mixing agitator driving motor, the liquid adding device driving motor, the dry adding device driving motor and the sand conveying device driving motor are all connected to a frequency converter, and the frequency converter is fixedly installed in the frequency converter room; and the discharge pump driving motor is a rated speed driving motor;

Q, the suction pump driving motor, the mixing agitator driving motor, the liquid adding device driving motor, the dry adding device driving motor and the sand conveying device driving motor are all connected to a frequency converter, and the frequency converter is fixedly installed in the frequency converter room; the discharge pump driving motor is a rated speed driving motor; and a regulating valve is provided on the suction manifold; or R, the mixing agitator driving motor, the liquid adding device driving motor, the dry adding device driving motor, the sand conveying device driving motor and the discharge pump driving motor are all connected to a frequency converter, and the frequency converter is fixedly installed in the frequency converter room; the suction pump driving motor is a rated speed driving motor; and a regulating valve is provided on the suction manifold.

Preferably, the liquid adding device also communicates with the discharge manifold; a shut-off valve is provided on a connecting pipeline between the liquid adding device and the mixing agitator, and another shut-off valve is provided on a connecting pipeline between the liquid adding device and the discharge manifold; when the liquid adding device is in communication with the mixing agitator, the shut-off valve on the connecting pipeline between the liquid adding device and the discharge manifold is closed; when the liquid adding device is in communication with the discharge manifold, the shut-off valve on the connecting pipeline between the liquid adding device and the mixing agitator is closed. As a result, liquid additive can be added in the mixing agitator or in the discharge manifold.

Preferably, the liquid adding device also communicates with the suction manifold; a shut-off valve is provided on a connecting pipeline between the liquid adding device and the suction manifold; when the liquid adding device is in communication with the mixing agitator, the shut-off valve on the connecting pipeline between the liquid adding device and the suction manifold as well as a shut-off valve on a connecting pipeline between the liquid adding device and the discharge manifold are closed; when the liquid adding device is in communication with the discharge manifold, a shut-off valve on a connecting pipeline between the liquid adding device and the mixing agitator as well as the shut-off valve on the connecting pipeline between the liquid adding device and the suction manifold are closed; when the liquid adding device is in communication with the suction manifold, the shut-off valve on the connecting pipeline between the liquid adding device and the mixing agitator as well as the shut-off valve on the connecting pipeline between the liquid adding device and the discharge manifold are closed. As a result, liquid additive can be added in the mixing agitator, in the discharge manifold, or in the suction manifold.

Preferably, the fully electric-drive sand mixer further comprises a liquid level gauge which is fixed inside the mixing agitator to display a height of a mixture in the mixing agitator.

Preferably, a first auxiliary manifold and a second auxiliary manifold are installed and in communication between the suction manifold and the discharge manifold; a first valve is provided on the suction manifold, a second valve is provided on the first auxiliary manifold, a third valve is provided on the second auxiliary manifold, and a fourth valve is provided on the discharge manifold; when the first valve and the fourth valve are opened while the second valve and the third valve are closed, the suction pump cooperates with the suction manifold while the discharge pump cooperates with the discharge manifold; when the first valve and the fourth valve are closed while the second valve and the third valve are opened, the suction pump cooperates with the second auxiliary manifold as well as the discharge manifold, and the discharge pump cooperates with the suction manifold as well as the first auxiliary manifold. With the foregoing structure, the sand mixer can suck on the left and discharge on the right, or suck on the right and discharge on the left.

Preferably, the foundation is a skid frame.

Preferably, the foundation is a sand mixing vehicle.

Preferably, the fully electric-drive sand mixer further comprises: a funnel screen, and a filter screen provided at a top part of the sand mixing tank, wherein vibration motors are provided on both the funnel screen and the filter screen. When fracturing proppant is blocked, the vibration motors can be activated to loosen the fracturing proppant for dredging.

An automatic control system for controlling the above fully electric-drive sand mixer is also provided, comprising:

a suction control system which is electrically connected to the suction pump driving motor, wherein the suction control system controls the suction pump driving motor to work;

a mixing control system which is electrically connected to the mixing agitator driving motor through the frequency converter, wherein the mixing control system controls the frequency converter to change a rotating speed of the mixing agitator driving motor, thereby controlling a rotating speed of a stirring blade in the mixing agitator;

a dry adding control system which is electrically connected to the dry adding device driving motor through the frequency converter, wherein the dry adding control system controls the frequency converter to change a rotating speed of the dry adding device driving motor, thereby controlling a dry powder additive dosage of the dry adding device;

a liquid adding control system which is electrically connected to the liquid adding device driving motor through the frequency converter, wherein the liquid adding control system controls the frequency converter to change a rotating speed of the liquid adding device driving motor, thereby controlling a liquid additive dosage of the liquid adding device;

a sand conveying control system which is electrically connected to the sand conveying device driving motor through the frequency converter, wherein the sand conveying control system controls the frequency converter to change a rotating speed of the sand conveying device driving motor, thereby changing a proppant input amount of the sand conveying device; and a discharge control system which is electrically connected to the discharge pump, wherein the discharge control system controls the discharge pump to work.

Preferably, the suction control system is electrically connected to the suction pump driving motor through the frequency converter, and the suction control system controls the frequency converter to change a rotating speed of the suction pump driving motor, thereby controlling a suction volume of the suction pump.

Preferably, the suction control system is electrically connected to the suction pump driving motor through the frequency converter, and the suction control system controls the frequency converter to change a rotating speed of the suction pump driving motor, and controls a suction volume of the suction pump via a cooperation with the regulating valve.

Preferably, the suction control system is directly and electrically connected to the suction pump driving motor; the suction pump driving motor is a commonly-used non-variable-frequency motor; the suction control system controls the suction pump driving motor to work, and controls a suction volume of the suction pump via the regulating valve.

Preferably, the discharge control system is electrically connected to the discharge pump driving motor through the frequency converter, and the discharge control system controls the frequency converter to change a rotating speed of the discharge pump driving motor, thereby controlling a discharge volume of the discharge pump.

Preferably, the discharge control system is directly and electrically connected to the discharge pump driving motor; the discharge pump driving motor is a commonly-used non-variable-frequency motor; and the discharge control system controls the discharge pump driving motor to work.

Preferably, the automatic control system further comprises a liquid level gauge which is placed inside the mixing agitator and is electrically connected to the suction control system. The liquid level gauge is used to display the liquid level in the mixing agitator and transmit liquid level data to the suction control system in real time, so the suction control system can control the liquid supply amount for the suction pump according to the liquid level data.

Preferably, the automatic control system further comprises a vibration control system which is electrically connected to a vibration motor to control the on-off of the vibration motor.

Compared with the prior art, the beneficial effects of the present invention are as follows.

1. All the devices in the present invention are driven by the motors rather than hydraulic drive, the structure and driving process are relatively simple, and the maintenance is convenient.
2. All the devices in the present invention are driven by the motors, no hydraulic oil is required, and there is no danger of environmental pollution.
3. All the devices in the present invention are driven by the motors, and no heat sink is needed, which reduces noise and energy consumption, and further reduces the failure rate and the operating cost.
4. According to the equipment layout of the present invention, when maintaining the suction pump, the suction pump driving motor, the discharge pump, the discharge pump driving motor, the liquid adding device, the liquid adding device driving motor and the various manifolds, only the foundation plate at the corresponding position needs to be removed, and there is no need to dismantle large facilities such as the operation room and the frequency converter room.
5. The present invention adopts fully-electric drive, which has high responding speed and control accuracy.
6. The present invention adopts fully-electric drive, which has low noise and can be operated at night, thereby improving work efficiency.
7. The present invention adopts an automatic control system, which has high degree of automation, simple operation and precise control.
8. The present invention adopts the vibration motor, effectively preventing sand accumulation.

Element reference: 01—foundation, 011—upper foundation layer, 012—lower foundation layer, 02—suction pump, 03—suction pump driving motor, 04—suction manifold, 05—mixing agitator, 06—mixing agitator driving motor, 07—dry adding device, 08—dry adding device driving motor, 09—liquid adding device, 10—liquid adding device driving motor, 11—sand conveying device, 12—sand conveying device driving motor, 13—discharge pump, 14—discharge pump driving motor, 15—discharge manifold, 16—frequency converter room, 17—operation room, 18—foundation plate, 19—regulating valve, 20—vibration motor, 21—switch valve, 211—first switch valve, 212—second switch valve, 213—third switch valve, 214—fourth switch valve, 22—first auxiliary manifold, 23—second auxiliary manifold.

DETAILED DESCRIPTION OF THE PREFERRED EMBODIMENT

The present invention will be further described in detail below in conjunction with embodiments. However, the scope of the above-mentioned subject matter of the present invention is not limited to the following embodiments. Any modifications, equivalent substitutions and improvements made within the spirit and principle of the present invention should fall into the protection scope of the present invention.

Embodiment 1

Figure 1:
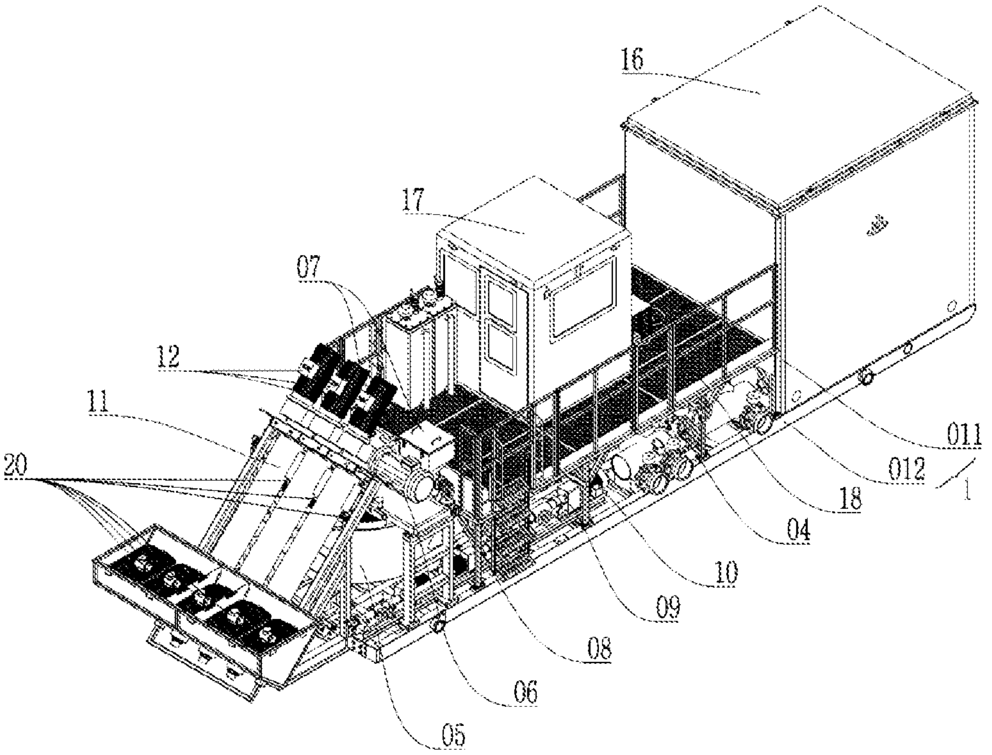
FIG. 1 is a perspective view of the present invention.
Figure 2:
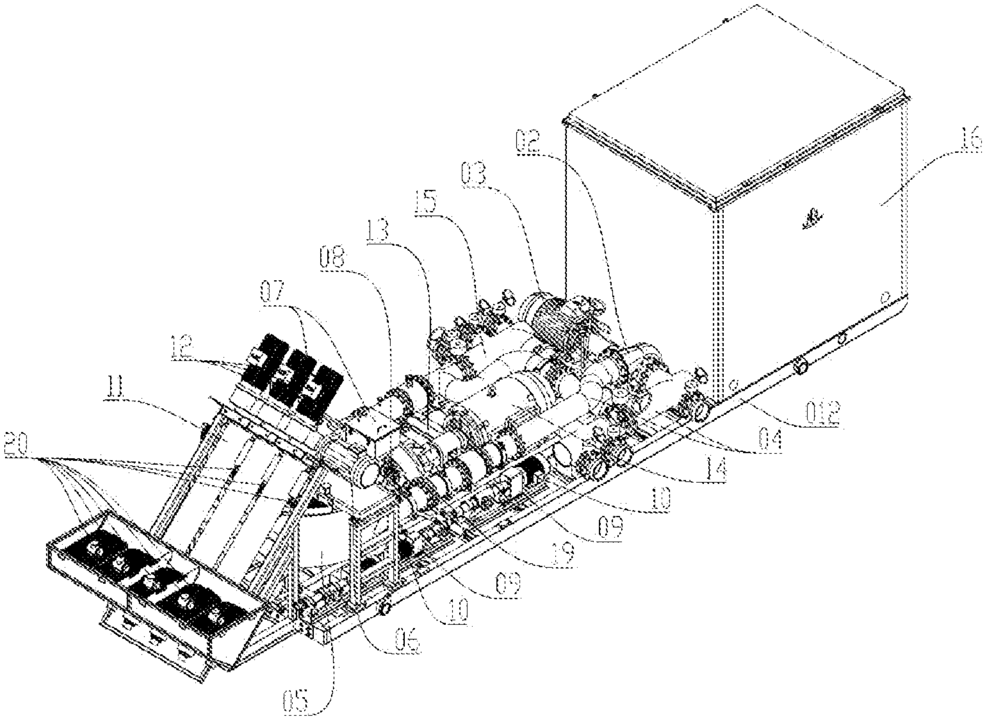
FIG. 2 is a perspective view of the present invention after an operation room and an upper foundation layer are removed.
Figure 3:
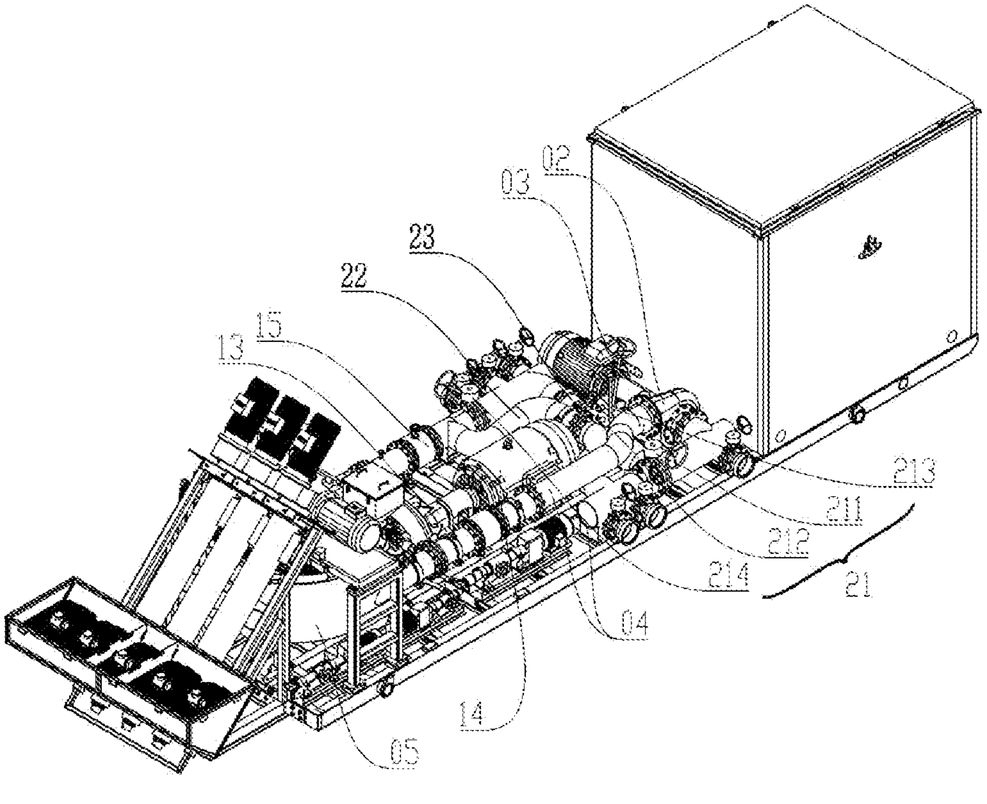
FIG. 3 is another perspective view of the present invention after the operation room and the upper foundation layer are removed.

Referring to FIGS. 1-3, the fully electric-drive sand mixer comprises a skid frame 01 (also referred to as foundation 01), a suction pump 02, a suction pump driving motor 03, a suction manifold 04, a mixing agitator 05, a mixer agitator driving motor 06, dry adding devices 07, dry adding device driving motors 08, liquid adding devices 09, liquid adding device driving motors 10, a sand conveying device 11, sand conveying device driving motors 12, a discharge pump 13, a discharge pump driving motor 14, a discharge manifold 15, a frequency converter room 16, an operation room 17, foundation plates 18, a regulating valve 19, vibration motors 20, a switch valve 21, a first auxiliary manifold 22, and a second auxiliary manifold 23. In other embodiments, the skid frame 01 can be replaced with a sand mixing vehicle. The frequency converter room 16 can be fixed to the skid frame 01 or can be independent as a skid. The skid frame 01 is divided into an upper skid layer 011 (also called an upper foundation layer 011) and a lower skid layer (also called a lower foundation layer 012). The suction pump 02, the suction pump driving motor 03, the suction manifold 04, the liquid adding devices 09, the liquid adding device driving motors 10, the discharge pump 13, the discharge pump driving motor 14, the discharge manifold 15, the frequency converter room 16, the first auxiliary manifold 22 and the second auxiliary manifold 23 are fixed to the lower skid layer 012. The dry adding devices 07 and the operation room 17 are fixed to the upper skid layer 011. The foundation plate 18 is placed on and movably connected to the upper skid layer 011 for easy disassembly. An upper part of the sand conveying device 11 is fixed to the upper skid layer 011, and a lower part of the sand conveying device 11 is fixed to the lower skid layer 012. The sand conveying device 11 is inclined with reference to the lower skid layer 012.

According to the embodiment 1, the sand conveying device 11 has three augers, and each auger is equipped with one sand conveying device driving motor 12. One of the augers is of 8 inches, and the other two are of 12 inches. Five funnel screens are provided at a bottom of the sand conveying device 11, and each funnel screen is equipped with one vibration motor 20. The sand conveying device 11 is in communication with the mixing agitator 05. The sand conveying device 11 is fixed and electrically connected to each sand conveying device driving motor 12.

An upper part of the mixing agitator 05 is fixed to the upper foundation layer 011, while a lower part of the mixing agitator 05 is fixed to the lower skid layer 012. The mixing agitator driving motor 06 is fixed to the upper part of the mixing agitator 05, and the mixing agitator 05 is electrically connected to the mixing agitator driving motor 06. The upper part of the mixer agitator 05 is equipped with a filter screen. According to the embodiment 1, three vibration motors 20 are provided on the filter screen. When fracturing proppant is blocked on the filter screen, the vibration motors 20 are activated and vibrate the filter screen, so that the fracturing proppant is loosened and falls into a mixing tank. A liquid level gauge is provided in the mixing agitator 05 to display a liquid level of a mixture in the mixing agitator 05.

In this embodiment, two dry adding devices 07 are provided. In other embodiments, a quantity of the dry adding device is determined according to actual needs. The dry adding device driving motors 08 are fixed and electrically connected to the dry adding devices 07, and the dry adding devices 07 communicate with the mixing agitator 05.

In this embodiment, two liquid adding devices 09 are provided. In other embodiments, a quantity of the liquid adding device is determined according to actual needs. The liquid adding device driving motors 10 are fixed and electrically connected to the liquid adding devices 09, and the liquid adding devices 09 communicate with the mixing agitator 05.

In this embodiment, the suction pump 02 is fixed to the suction pump driving motor 03, and the suction pump 02 is fixed and communicates with one end of the suction manifold 04. A first switch valve 211 is provided on the suction manifold 04, so is a regulating valve 18. The other end of the suction manifold 04 communicates with to the mixing agitator 05. The discharge pump 13 is fixed to the discharge pump driving motor 14, and the discharge pump 13 is fixed and communicates with one end of the discharge manifold 15. A fourth switch valve 214 is provided on the discharge manifold 13. The other end of the discharge manifold 13 communicates with the mixing agitator 05. The first auxiliary manifold 22 and the second auxiliary manifold 23 are installed and in communication between the suction manifold 04 and the discharge manifold 13. A second switch valve 212 is provided on the first auxiliary manifold 22, and a third switch valve 213 is provided on the second auxiliary manifold 23. When the first switch valve 211 and the fourth switch valve 214 are opened while the second switch valve 212 and the third switch valve 213 are closed, the suction pump 02 cooperates with the suction manifold 04 while the discharge pump 13 cooperates with the discharge manifold 15. When the first switch valve 211 and the fourth switch valve 214 are closed while the second switch valve 212 and the third switch valve 213 are opened, the suction pump 02 cooperates with the discharge manifold 15 as well as the second auxiliary manifold 23, and the discharge pump 13 cooperates with the suction manifold 04 as well as the first auxiliary manifold 22. With the foregoing structure, the sand mixer can suck on the left and discharge on the right, or suck on the right and discharge on the left.

According to the embodiment 1, the liquid adding devices 09 further communicate with the suction manifold 04 and the discharge manifold 15. A shut-off valve is provided on a connecting pipeline between each liquid adding device 09 and the suction manifold 04, and another shut-off valve is provided on a connecting pipeline between each liquid adding device 09 and the discharge manifold 15. According to actual needs, the liquid adding devices 09 can directly add liquid additives to the mixing agitator 05, the suction manifold 04, or the discharge manifold 15.

According to the embodiment 1, the suction pump driving motor 03, the mixing agitator driving motor 06, the dry adding device driving motors 08, the liquid adding device driving motors 10, the sand conveying device driving motor 12, and the discharge pump driving motor 14 are all connected to a frequency converter, and the frequency converter is fixedly installed in the frequency converter room 16. In another embodiment, the suction pump driving motor 03 and the discharge pump driving motor 14 are not connected to the frequency converter, which are both commonly-used non-variable-frequency motors. In yet another embodiment, the suction pump driving motor 03 is connected to the frequency converter, and the discharge pump driving motor 14 is a commonly-used non-variable-frequency motor (i.e. not connected to the frequency converter); or the suction pump driving motor 03 is a commonly-used non-variable-frequency motor (i.e. not connected to the frequency converter), and the discharge pump driving motor 14 is connected to the frequency converter.

Embodiment 2

Figure 4:
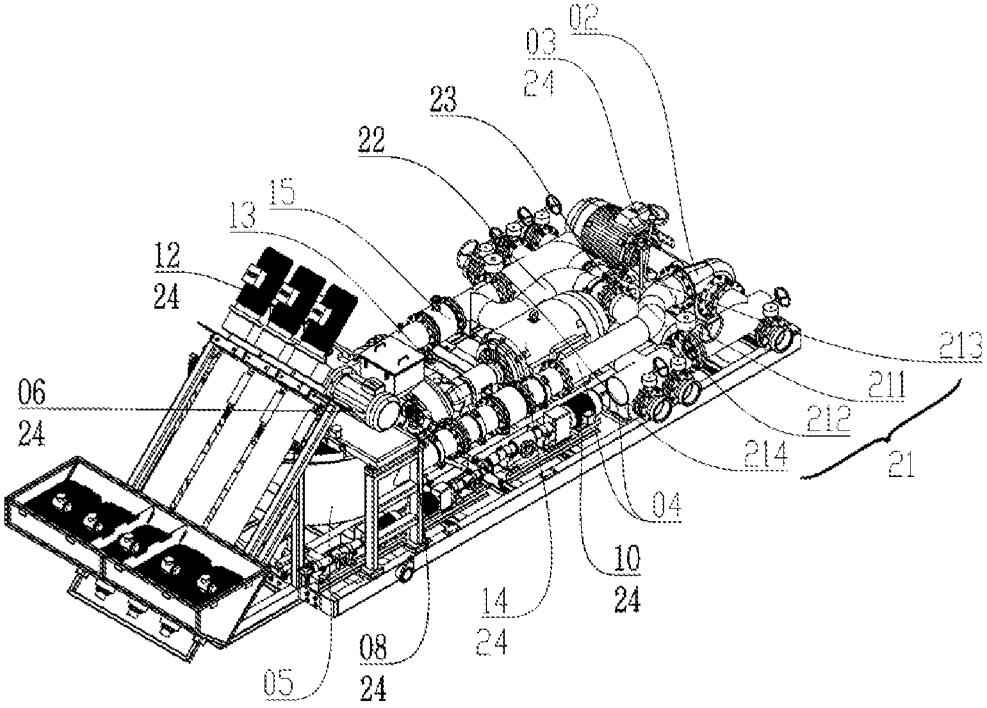
FIG. 4 is a perspective view of the present invention where a frequency converter and driving motors are integrated.
Figure 5:
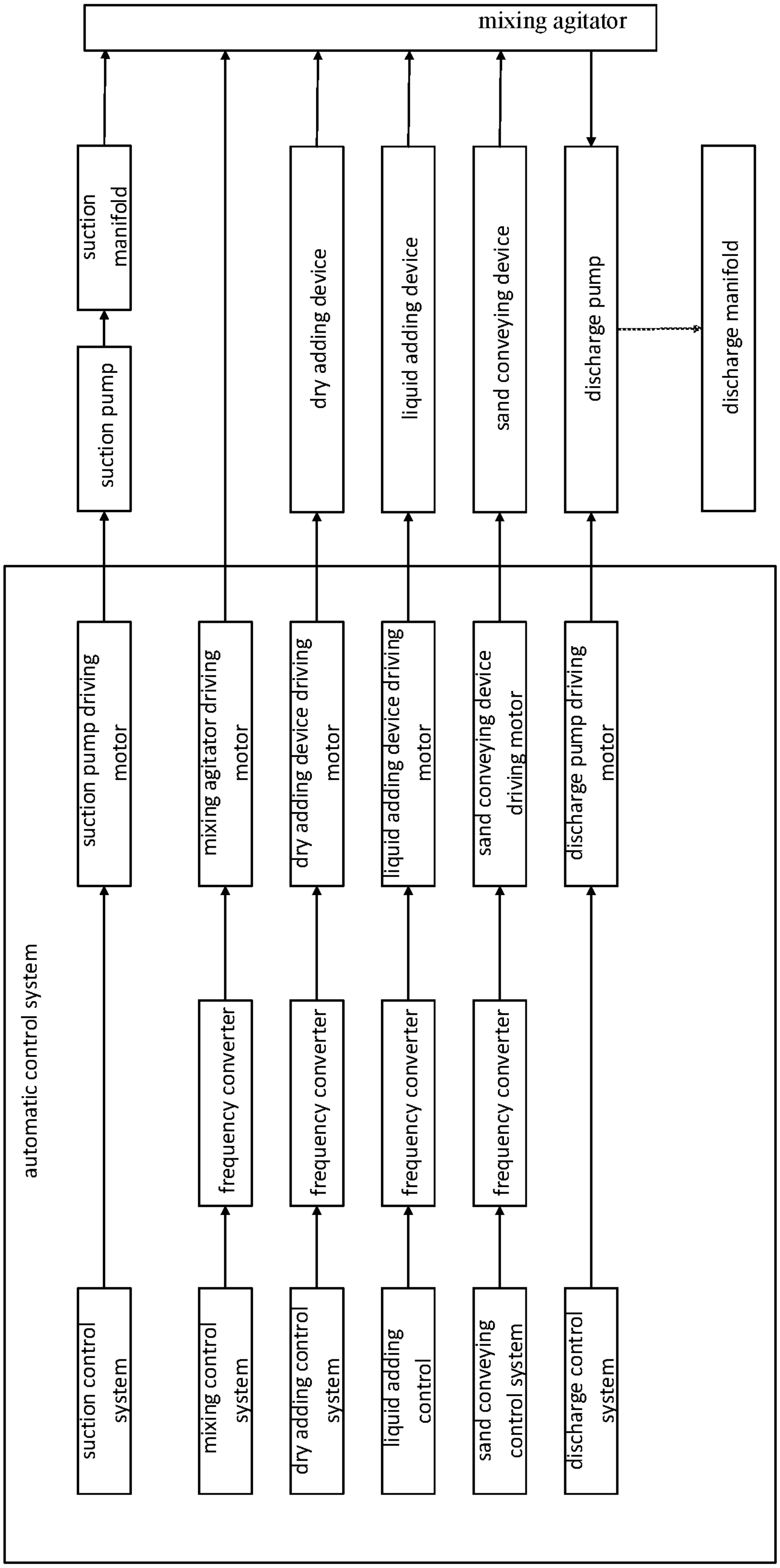
FIG. 5 is a block diagram of an automatic control system of the present invention.

Referring to FIG. 4, except for the frequency converter room 16, the structure of the embodiment 2 is the same as that of the embodiment 1, and will not be repeated here. In the embodiment 2, the frequency converter room 16 is not needed since the frequency converters 24 are integrated with the corresponding driving motors, which means the suction pump driving motor 03 is integrated with its frequency converter 24, the mixing agitator driving motor 06 is integrated with its frequency converter 24, the dry adding device driving motor 08 is integrated with its frequency converter 24, the liquid adding device driving motor 10 is integrated with its frequency converter 24, the sand conveying device driving motor 12 is integrated with its frequency converter 24, and the discharge pump driving motor 14 is integrated with its frequency converter 24. In other embodiments, the suction pump driving motor 03 or the discharge pump driving motor 14 is not integrated with the frequency converter 24, and is a commonly-used non-variable-frequency motor.

Embodiment 3

Figure 6:
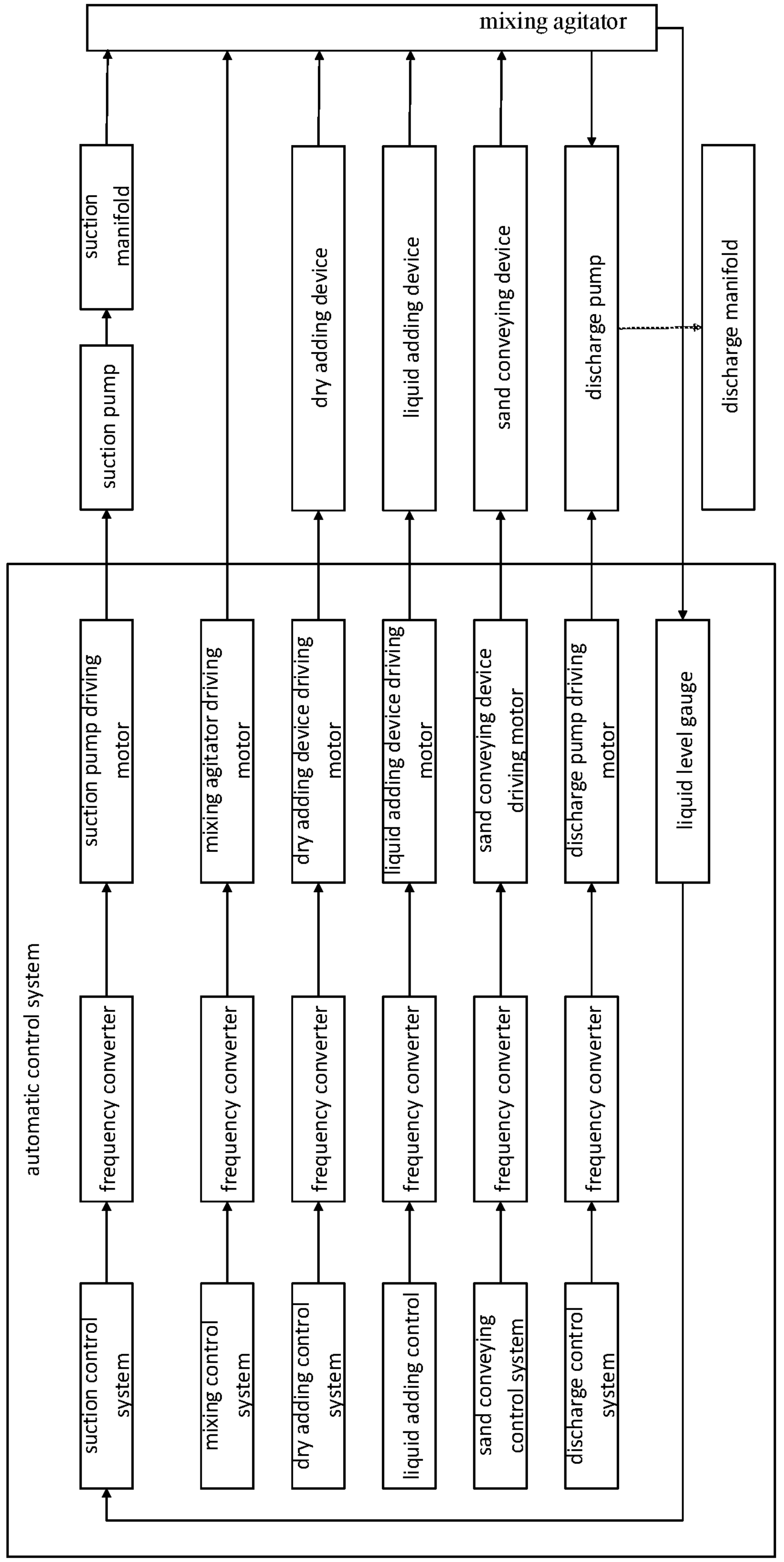
FIG. 6 is a block diagram of the automatic control system according to an embodiment of the present invention.

Referring to FIG. 6, an automatic control system for controlling the above fully electric-drive sand mixer is also provided, comprising:

a suction control system which is electrically connected to the suction pump 02 through the frequency converter, wherein the suction control system controls the frequency converter to change a rotating speed of the suction pump driving motor 03, thereby controlling a suction volume of the suction pump 02;

a mixing control system which is electrically connected to the mixing agitator driving motor 06 through the frequency converter, wherein the mixing control system controls the frequency converter to change a rotating speed of the mixing agitator driving motor 06, thereby controlling a rotating speed of a stirring blade in the mixing agitator 05;

a dry adding control system which is electrically connected to the dry adding device driving motor 08 through the frequency converter, wherein the dry adding control system controls the frequency converter to change a rotating speed of the dry adding device driving motor 08, thereby controlling a dry powder additive dosage of the dry adding device 07;

a liquid adding control system which is electrically connected to the liquid adding device driving motor 10 through the frequency converter, wherein the liquid adding control system controls the frequency converter to change a rotating speed of the liquid adding device driving motor 10, thereby controlling a liquid additive dosage of the liquid adding device 09;

a sand conveying control system which is electrically connected to the sand conveying device driving motor 12 through the frequency converter, wherein the sand conveying control system controls the frequency converter to change a rotating speed of the sand conveying device driving motor 12, thereby changing a proppant input amount of the sand conveying device 11;

a discharge control system which is electrically connected to the discharge pump driving motor 14 through the frequency converter, wherein the discharge control system controls the frequency converter to change a rotating speed of the discharge pump driving motor 14, thereby controlling a discharge volume of the discharge pump 13; and a liquid level gauge which is placed inside the mixing agitator 05 and is electrically connected to the suction control system.

In other embodiments, a vibration control system can be added or the liquid level gauge can be removed.

Embodiment 4

Figure 7:
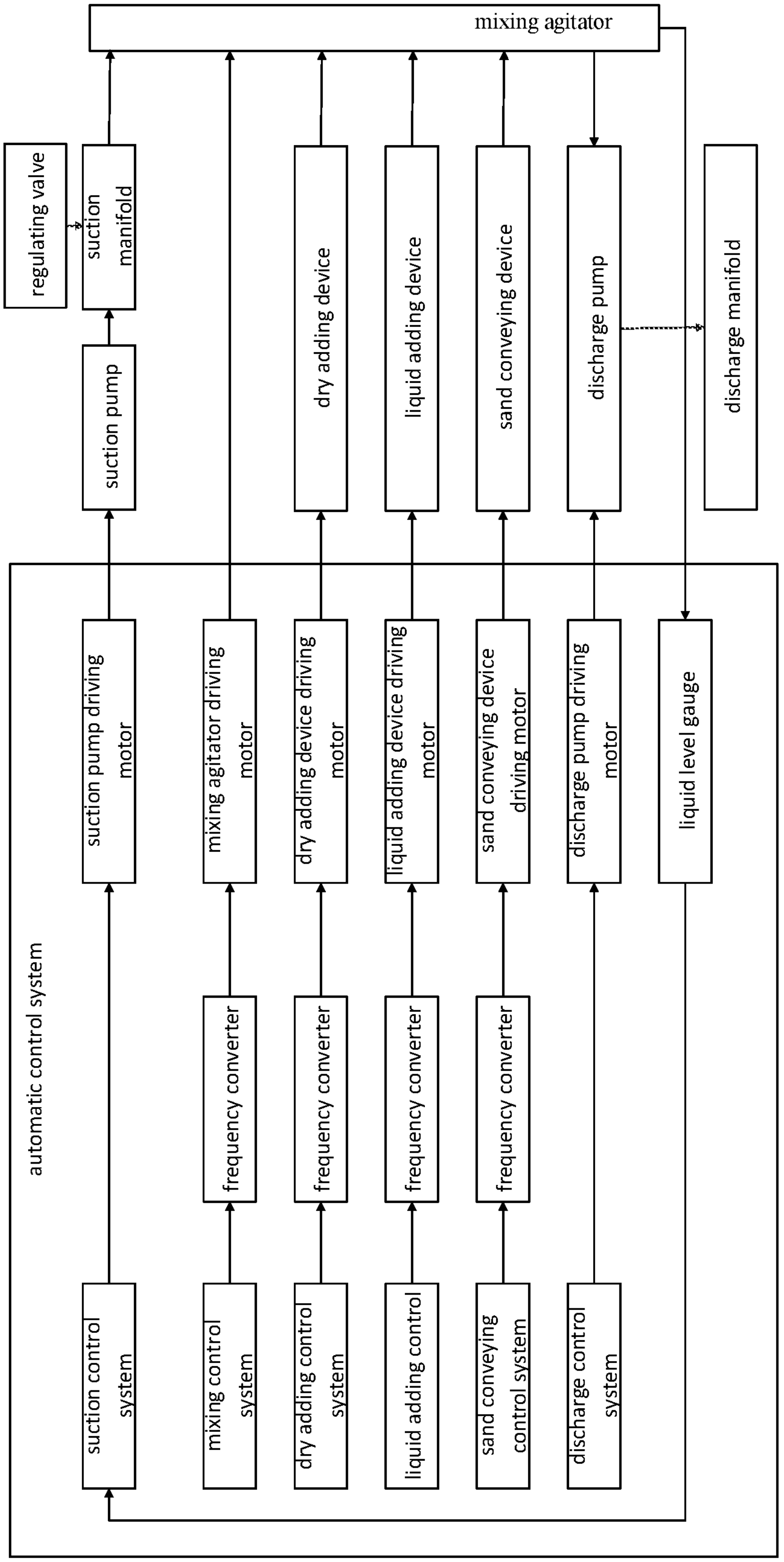
FIG. 7 is a block diagram of the automatic control system according to another embodiment of the present invention.

Referring to FIG. 7, an automatic control system for controlling the above fully electric-drive sand mixer is also provided, comprising:

a suction control system which is electrically connected to the suction pump driving motor 03, wherein the suction control system controls the suction pump driving motor 03 to work, and controls a suction volume of the suction pump 02 via the regulating valve 19;

a mixing control system which is electrically connected to the mixing agitator driving motor 06 through the frequency converter, wherein the mixing control system controls the frequency converter to change a rotating speed of the mixing agitator driving motor 06, thereby controlling a rotating speed of a stirring blade in the mixing agitator 05;

a dry adding control system which is electrically connected to the dry adding device driving motor 08 through the frequency converter, wherein the dry adding control system controls the frequency converter to change a rotating speed of the dry adding device driving motor 08, thereby controlling a dry powder additive dosage of the dry adding device 07;

a liquid adding control system which is electrically connected to the liquid adding device driving motor 10 through the frequency converter, wherein the liquid adding control system controls the frequency converter to change a rotating speed of the liquid adding device driving motor 10, thereby controlling a liquid additive dosage of the liquid adding device 09;

a sand conveying control system which is electrically connected to the sand conveying device driving motor 12 through the frequency converter, wherein the sand conveying control system controls the frequency converter to change a rotating speed of the sand conveying device driving motor 12, thereby changing a proppant input amount of the sand conveying device 11;

a discharge control system which is electrically connected to the discharge pump driving motor 14, wherein the discharge control system controls the discharge pump 13 to work; and a liquid level gauge which is placed inside the mixing agitator 05, wherein the liquid level gauge is electrically connected to the suction control system.

In other embodiments, a vibration control system can be added or the liquid level gauge can be removed.

Embodiment 5

Figure 8:
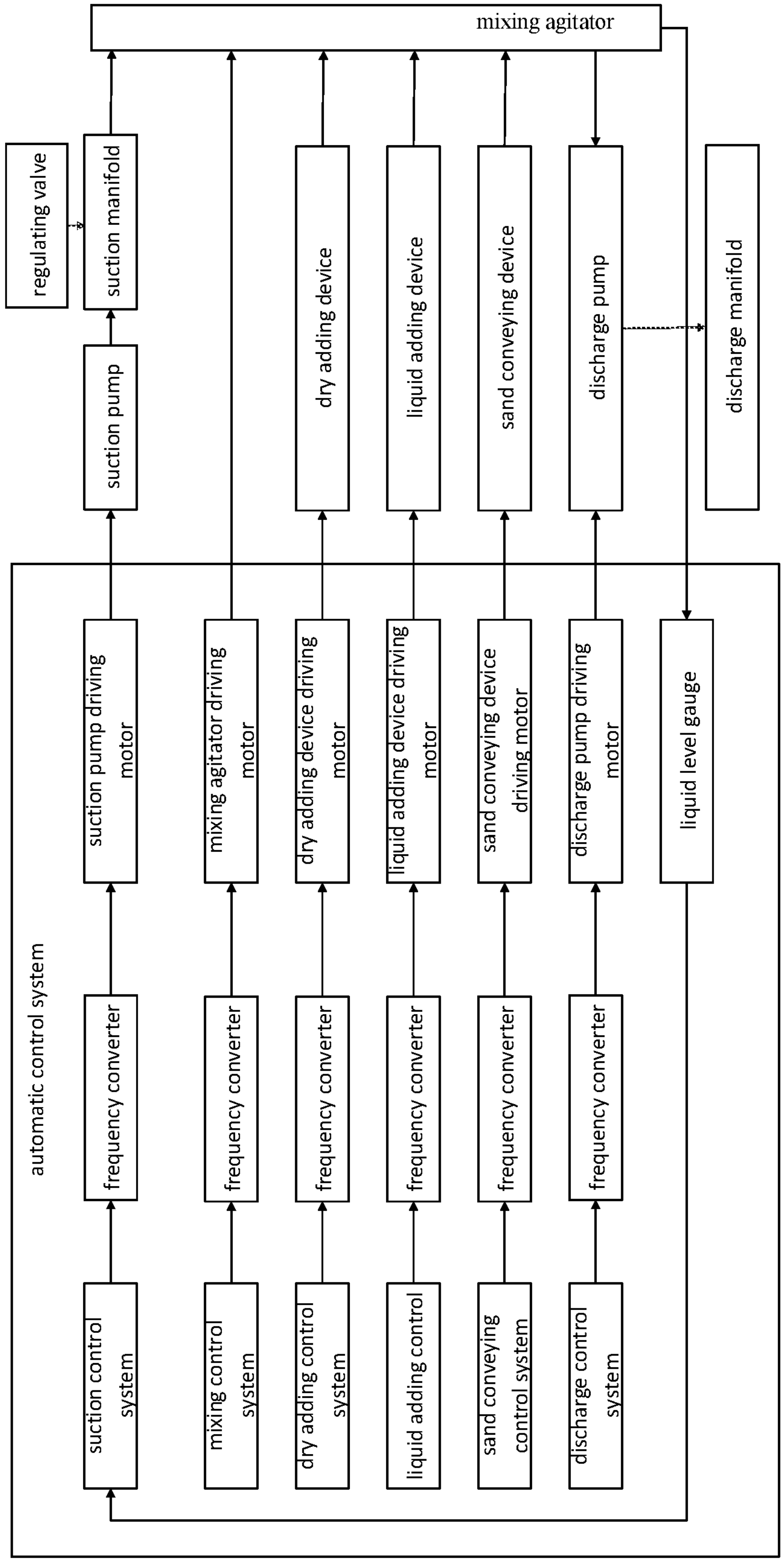
FIG. 8 is a block diagram of the automatic control system according to another embodiment of the present invention.

Referring to FIG. 8, an automatic control system for controlling the above fully electric-drive sand mixer is also provided, comprising:

a suction control system which is electrically connected to the suction pump 02 through the frequency converter, wherein the suction control system controls the frequency converter to change a rotating speed of the suction pump driving motor 03, and controls a suction volume of the suction pump 02 via a cooperation with the regulating valve 19;

a mixing control system which is electrically connected to the mixing agitator driving motor 06 through the frequency converter, wherein the mixing control system controls the frequency converter to change a rotating speed of the mixing agitator driving motor 06, thereby controlling a rotating speed of a stirring blade in the mixing agitator 05;

a dry adding control system which is electrically connected to the dry adding device driving motor 08 through the frequency converter, wherein the dry adding control system controls the frequency converter to change a rotating speed of the dry adding device driving motor 08, thereby controlling a dry powder additive dosage of the dry adding device 07;

a liquid adding control system which is electrically connected to the liquid adding device driving motor 10 through the frequency converter, wherein the liquid adding control system controls the frequency converter to change a rotating speed of the liquid adding device driving motor 10, thereby controlling a liquid additive dosage of the liquid adding device 09;

a sand conveying control system which is electrically connected to the sand conveying device driving motor 12 through the frequency converter, wherein the sand conveying control system controls the frequency converter to change a rotating speed of the sand conveying device driving motor 12, thereby changing a proppant input amount of the sand conveying device 11;

a discharge control system which is electrically connected to the discharge pump driving motor 14 through the frequency converter, wherein the discharge control system controls the frequency converter to change a rotating speed of the discharge pump driving motor 14, thereby controlling a discharge volume of the discharge pump 13; and a liquid level gauge which is placed inside the mixing agitator 05 and is electrically connected to the suction control system.

In other embodiments, a vibration control system can be added or the liquid level gauge can be removed.

Embodiment 6

Figure 9:
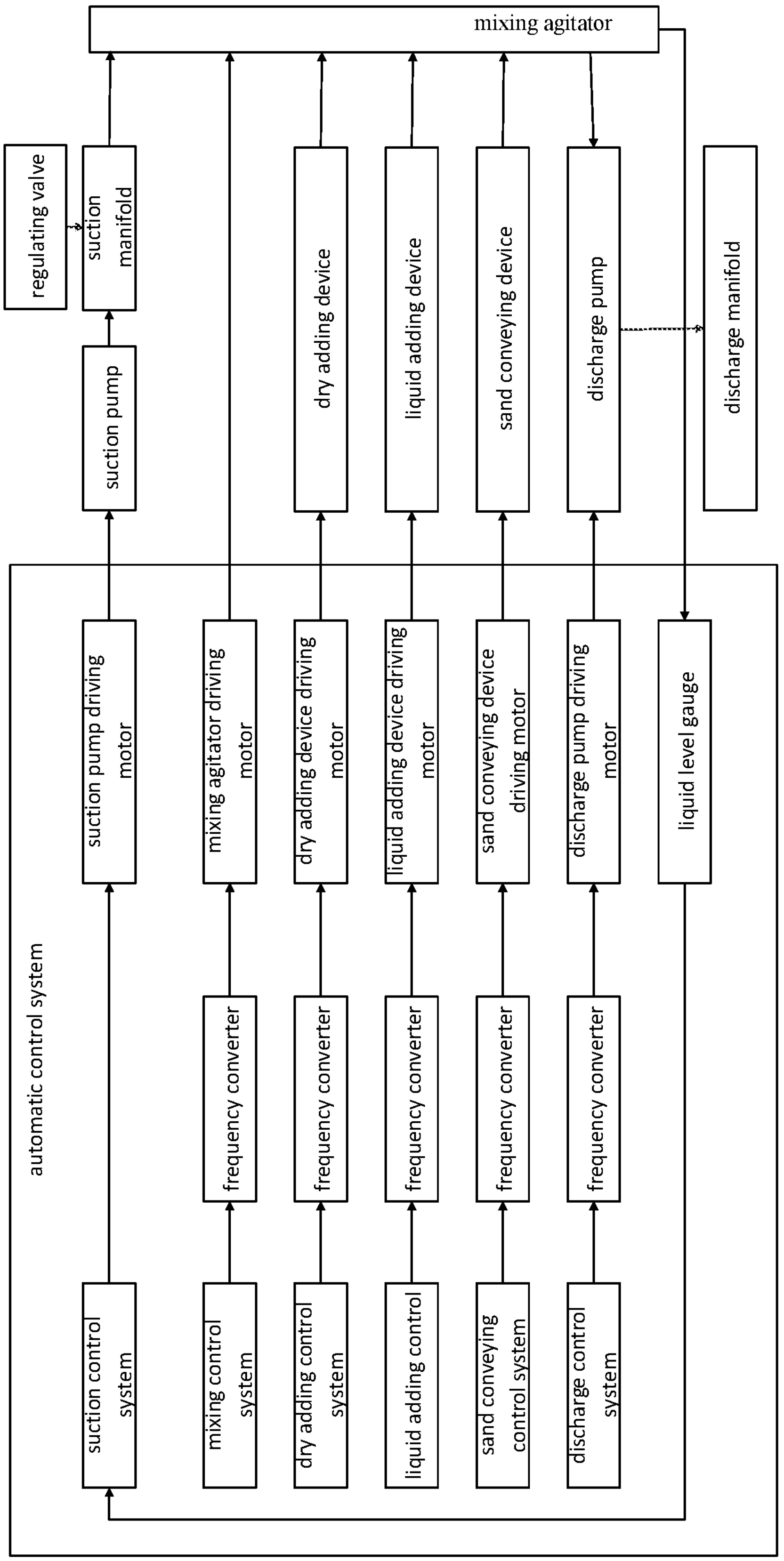
FIG. 9 is a block diagram of the automatic control system according to another embodiment of the present invention.

Referring to FIG. 9, an automatic control system for controlling the above fully electric-drive sand mixer is also provided, comprising:

a suction control system which is electrically connected to the suction pump driving motor 03, wherein the suction control system controls the suction pump driving motor 03 to work, and controls a suction volume of the suction pump 02 via the regulating valve 19;

a mixing control system which is electrically connected to the mixing agitator driving motor 06 through the frequency converter, wherein the mixing control system controls the frequency converter to change a rotating speed of the mixing agitator driving motor 06, thereby controlling a rotating speed of a stirring blade in the mixing agitator 05;

a dry adding control system which is electrically connected to the dry adding device driving motor 08 through the frequency converter, wherein the dry adding control system controls the frequency converter to change a rotating speed of the dry adding device driving motor 08, thereby controlling a dry powder additive dosage of the dry adding device 07;

a liquid adding control system which is electrically connected to the liquid adding device driving motor 10 through the frequency converter, wherein the liquid adding control system controls the frequency converter to change a rotating speed of the liquid adding device driving motor 10, thereby controlling a liquid additive dosage of the liquid adding device 09;

a sand conveying control system which is electrically connected to the sand conveying device driving motor 12 through the frequency converter, wherein the sand conveying control system controls the frequency converter to change a rotating speed of the sand conveying device driving motor 12, thereby changing a proppant input amount of the sand conveying device 11;

a discharge control system which is electrically connected to the discharge pump driving motor 14 through the frequency converter, wherein the discharge control system controls the frequency converter to change a rotating speed of the discharge pump driving motor 14, thereby controlling a discharge volume of the discharge pump 13; and a liquid level gauge which is placed inside the mixing agitator 05 and is electrically connected to the suction control system.

In other embodiments, a vibration control system can be added or the liquid level gauge can be removed.

Embodiment 7

Figure 10:
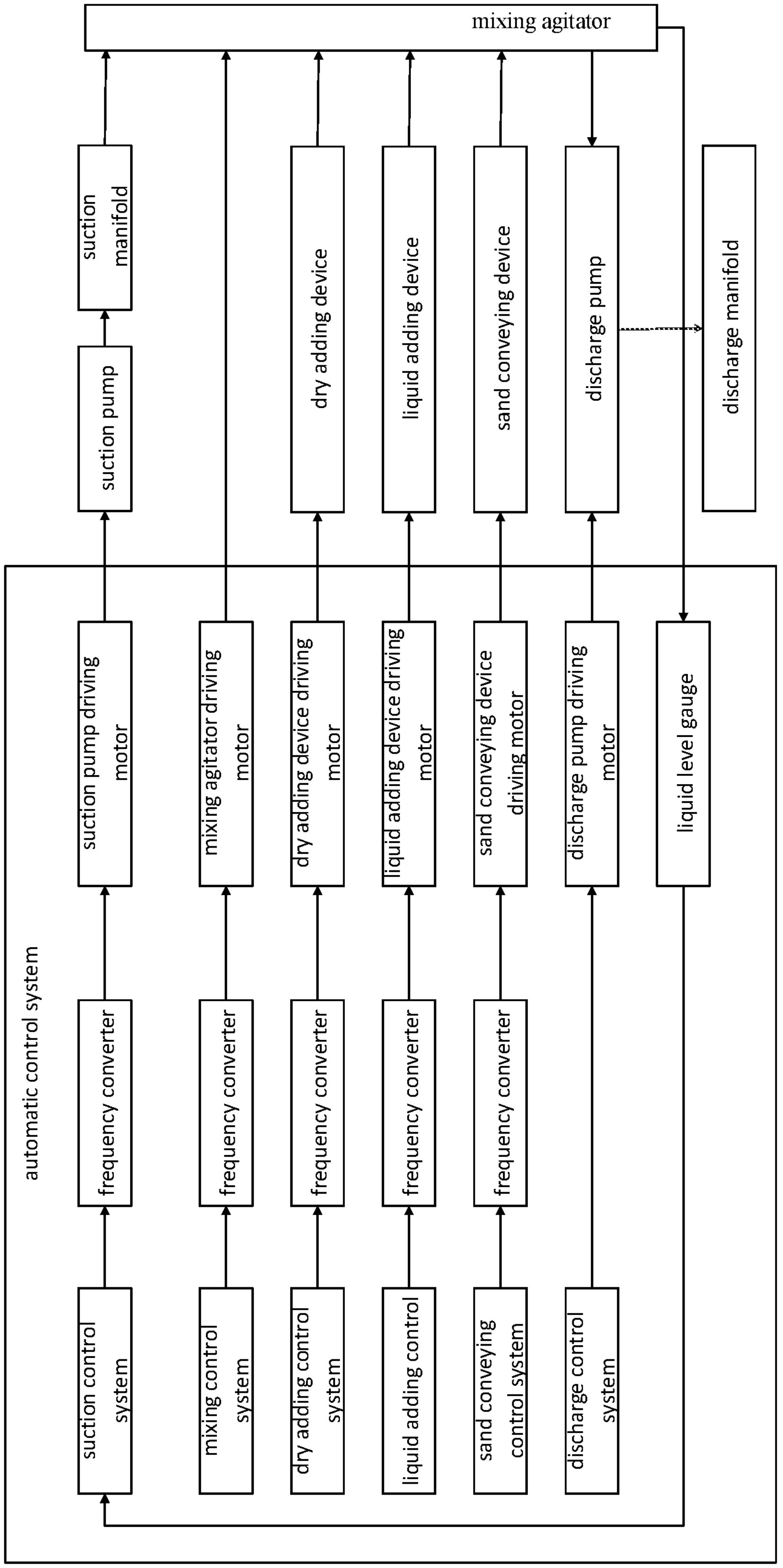
FIG. 10 is a block diagram of the automatic control system according to another embodiment of the present invention.

Referring to FIG. 10, an automatic control system for controlling the above fully electric-drive sand mixer is also provided, comprising:

a suction control system which is electrically connected to the suction pump 02 through the frequency converter, wherein the suction control system controls the frequency converter to change a rotating speed of the suction pump driving motor 03, thereby controlling a suction volume of the suction pump 02;

a mixing control system which is electrically connected to the mixing agitator driving motor 06 through the frequency converter, wherein the mixing control system controls the frequency converter to change a rotating speed of the mixing agitator driving motor 06, thereby controlling a rotating speed of a stirring blade in the mixing agitator 05;

a dry adding control system which is electrically connected to the dry adding device driving motor 08 through the frequency converter, wherein the dry adding control system controls the frequency converter to change a rotating speed of the dry adding device driving motor 08, thereby controlling a dry powder additive dosage of the dry adding device 07;

a liquid adding control system which is electrically connected to the liquid adding device driving motor 10 through the frequency converter, wherein the liquid adding control system controls the frequency converter to change a rotating speed of the liquid adding device driving motor 10, thereby controlling a liquid additive dosage of the liquid adding device 09;

a sand conveying control system which is electrically connected to the sand conveying device driving motor 12 through the frequency converter, wherein the sand conveying control system controls the frequency converter to change a rotating speed of the sand conveying device driving motor 12, thereby changing a proppant input amount of the sand conveying device 11;

a discharge control system which is electrically connected to the discharge pump driving motor 14, wherein the discharge control system controls the discharge pump 13 to work; and a liquid level gauge which is placed inside the mixing agitator 05, wherein the liquid level gauge is electrically connected to the suction control system.

In other embodiments, a vibration control system can be added or the liquid level gauge can be removed.

Embodiment 8

Figure 11:
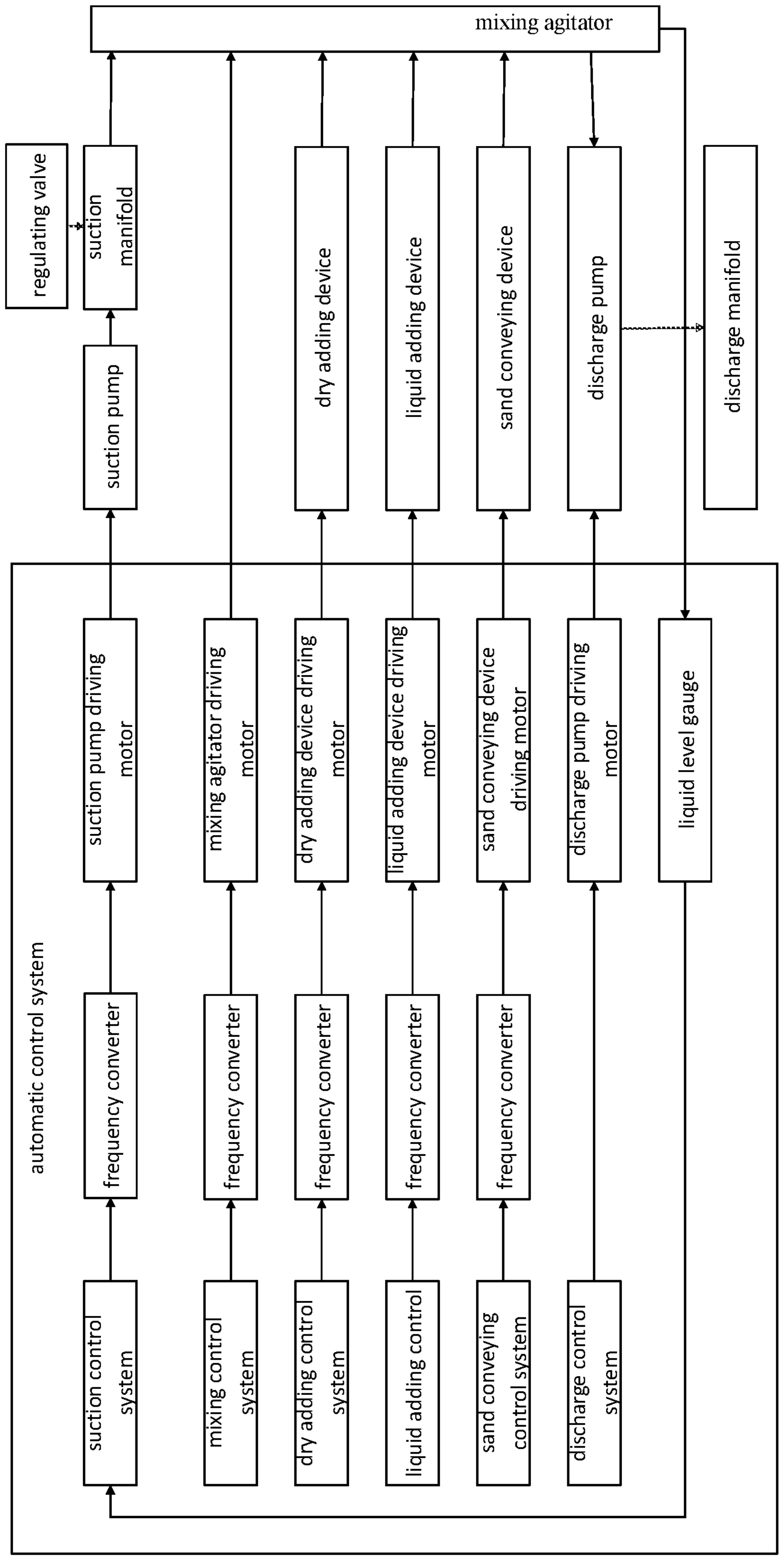
FIG. 11 is a block diagram of the automatic control system according to another embodiment of the present invention.

Referring to FIG. 11, an automatic control system for controlling the above fully electric-drive sand mixer is also provided, comprising:

a suction control system which is electrically connected to the suction pump 02 through the frequency converter, wherein the suction control system controls the frequency converter to change a rotating speed of the suction pump driving motor 03, and controls a suction volume of the suction pump 02 via the regulating valve 19;

a mixing control system which is electrically connected to the mixing agitator driving motor 06 through the frequency converter, wherein the mixing control system controls the frequency converter to change a rotating speed of the mixing agitator driving motor 06, thereby controlling a rotating speed of a stirring blade in the mixing agitator 05;

a dry adding control system which is electrically connected to the dry adding device driving motor 08 through the frequency converter, wherein the dry adding control system controls the frequency converter to change a rotating speed of the dry adding device driving motor 08, thereby controlling a dry powder additive dosage of the dry adding device 07;

a liquid adding control system which is electrically connected to the liquid adding device driving motor 10 through the frequency converter, wherein the liquid adding control system controls the frequency converter to change a rotating speed of the liquid adding device driving motor 10, thereby controlling a liquid additive dosage of the liquid adding device 09;

a sand conveying control system which is electrically connected to the sand conveying device driving motor 12 through the frequency converter, wherein the sand conveying control system controls the frequency converter to change a rotating speed of the sand conveying device driving motor 12, thereby changing a proppant input amount of the sand conveying device 11;

a discharge control system which is electrically connected to the discharge pump driving motor 14, wherein the discharge control system controls the discharge pump 13 to work; and a liquid level gauge which is placed inside the mixing agitator 05, wherein the liquid level gauge is electrically connected to the suction control system.

In other embodiments, a vibration control system can be added or the liquid level gauge can be removed.

Embodiment 9

Figure 12:
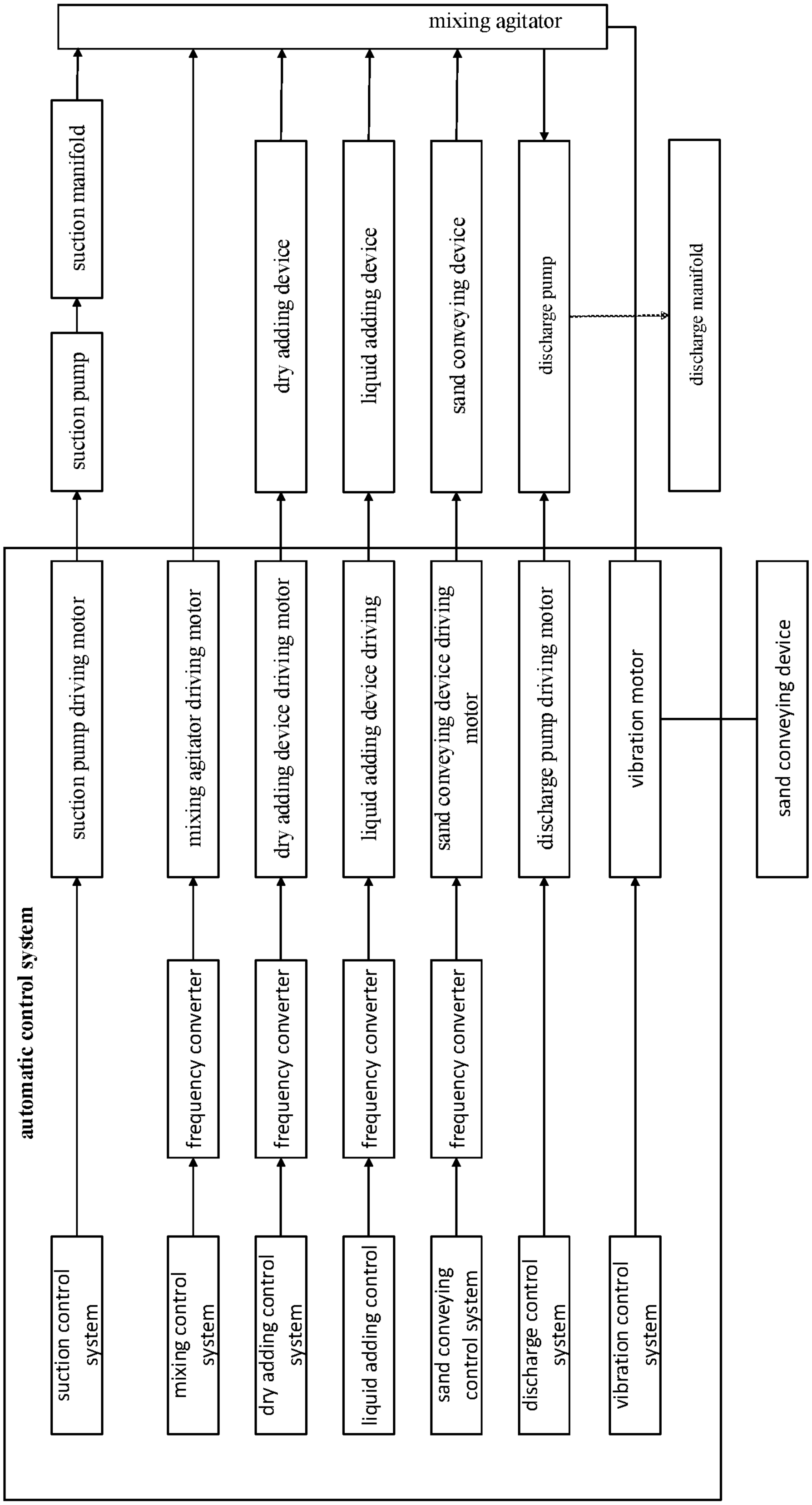
FIG. 12 is a block diagram of the automatic control system according to another embodiment of the present invention.

Referring to FIG. 12, an automatic control system for controlling the above fully electric-drive sand mixer is also provided, comprising:

a suction control system which is electrically connected to the suction pump driving motor 03, wherein the suction control system controls the suction pump driving motor 03 to work;

a mixing control system which is electrically connected to the mixing agitator driving motor 06 through the frequency converter, wherein the mixing control system controls the frequency converter to change a rotating speed of the mixing agitator driving motor 06, thereby controlling a rotating speed of a stirring blade in the mixing agitator 05;

a dry adding control system which is electrically connected to the dry adding device driving motor 08 through the frequency converter, wherein the dry adding control system controls the frequency converter to change a rotating speed of the dry adding device driving motor 08, thereby controlling a dry powder additive dosage of the dry adding device 07;

a liquid adding control system which is electrically connected to the liquid adding device driving motor 10 through the frequency converter, wherein the liquid adding control system controls the frequency converter to change a rotating speed of the liquid adding device driving motor 10, thereby controlling a liquid additive dosage of the liquid adding device 09;

a sand conveying control system which is electrically connected to the sand conveying device driving motor 12 through the frequency converter, wherein the sand conveying control system controls the frequency converter to change a rotating speed of the sand conveying device driving motor 12, thereby changing a proppant input amount of the sand conveying device 11;

a discharge control system which is electrically connected to the discharge pump driving motor 14, wherein the discharge control system controls the discharge pump 13 to work; and a vibration control system which is electrically connected to the vibration motor 20 to turn on and off the vibration motor 20.

In other embodiments, the above vibration control system can be removed or the level gauge can be added, wherein the liquid level gauge is placed inside the mixing agitator 05, and is electrically connected to the suction control system.

What is claimed is:

1. A fully electric-drive sand mixer, comprising: a foundation which is divided into an upper foundation layer and a lower foundation layer;

a suction pump which is fixed to the lower foundation layer;

a suction pump driving motor which is fixed and electrically connected to the suction pump, wherein a bottom of the suction pump driving motor is fixed to the lower foundation layer;

a suction manifold which is fixed to the lower foundation layer, wherein one end of the suction manifold is fixed and communicates with one end of the suction pump;

a mixing agitator which communicates with the other end of the suction manifold, wherein the mixing agitator is fixed to both the upper foundation layer and the lower foundation layer;

a mixing agitator driving motor which is fixed to a top of the mixing agitator, wherein the mixing agitator driving motor is electrically connected to the mixing agitator;

a dry adding device which is fixed to the upper foundation layer, wherein the dry adding device communicates with the mixing agitator, and a quantity of the dry adding device is M, and M≥1;

a dry adding device driving motor which is fixed and electrically connected to the dry adding device, wherein a quantity of the dry adding device driving motor is equal to the quantity of the dry adding device;

a liquid adding device which is fixed to the lower foundation layer, wherein the liquid adding device communicates with the mixing agitator, and a quantity of the liquid adding device is N, and N≥1;

a liquid adding device driving motor which is fixed and electrically connected to the liquid adding device, wherein a bottom of the liquid adding device driving motor is fixed to the lower foundation layer, and a quantity of the liquid adding device driving motor is equal to the quantity of the liquid adding device;

a sand conveying device which is fixed to both the upper foundation layer and the lower foundation layer, wherein the electric sand conveying device is inclined with reference to a foundation plate, and the sand conveying device communicates with the mixing agitator;

a sand conveying device driving motor which is fixed and electrically connected to a top of the sand conveying device;

a discharge pump which is fixed to the lower foundation layer, wherein the discharge pump communicates with the mixing agitator;

a discharge pump driving motor which is fixed and electrically connected to the discharge pump, wherein the discharge pump driving motor is also fixed to the lower foundation layer;

a discharge manifold, wherein one end of the discharge manifold is fixed and communicates with the discharge pump, and also communicates with the mixing agitator; the discharge manifold is fixed to the lower foundation layer; and an operation room which is fixed to the upper foundation layer.

2. The fully electric-drive sand mixer, as recited in claim 1, wherein:

the sand conveying device is fixedly installed at one end of the foundation; L pieces of the foundation plates are provided on the upper foundation layer, and L≥2; the foundation plates are detachable; the mixing agitator is installed just next to the sand conveying device; the top of the mixing agitator is fixed to the upper foundation layer, and a bottom of the mixing agitator is fixed to the lower foundation layer; the discharge pump, the discharge pump driving motor, the discharge manifold, the suction pump, the suction pump driving motor, the suction manifold, the liquid adding device, and the liquid adding device driving motor are all fixed to the lower foundation layer, and are all arranged between the upper foundation layer and the lower foundation layer; the operation room is fixedly installed on the upper foundation layer and is located above the discharge pump, the discharge pump driving motor, the discharge manifold, the suction pump, the suction pump driving motor, the suction manifold, the liquid adding device, and the liquid adding device driving motor.

3. The fully electric-drive sand mixer, as recited in claim 2, wherein: the suction pump driving motor, the mixing agitator driving motor, the liquid adding device driving motor, the dry adding device driving motor, the sand conveying device driving motor and the discharge pump driving motor are configured as: the mixing agitator driving motor, the liquid adding device driving motor, the dry adding device driving motor and the sand conveying device driving motor are all connected to a frequency converter; the suction pump driving motor is a variable-frequency motor connected to the frequency converter or a rated speed driving motor; the discharge pump driving motor is a variable-frequency motor connected to the frequency converter or a rated speed driving motor; the frequency converter is integrated with the driving motors or fixedly installed in the frequency converter room.

4. The fully electric-drive sand mixer, as recited in claim 3, further comprising: a frequency converter room which is installed in any one of the following two forms:

A, the frequency converter room is fixedly installed at the other end of the foundation, and is fixed to the lower foundation layer; or B, the frequency converter room is independent as a skid.

5. The fully electric-drive sand mixer, as recited in claim 2, wherein: a regulating valve is provided on the suction manifold.

6. The fully electric-drive sand mixer, as recited in claim 3, wherein: the liquid adding device further communicates with the discharge manifold; a shut-off valve is provided on a connecting pipeline between the liquid adding device and the mixing agitator, and another shut-off valve is provided on a connecting pipeline between the liquid adding device and the discharge manifold; when the liquid adding device is in communication with the mixing agitator, the shut-off valve on the connecting pipeline between the liquid adding device and the discharge manifold is closed; and when the liquid adding device is in communication with the discharge manifold, the shut-off valve on the connecting pipeline between the liquid adding device and the mixing agitator is closed.

7. The fully electric-drive sand mixer, as recited in claim 3, wherein: the liquid adding device further communicates with the suction manifold; a shut-off valve is provided on a connecting pipeline between the liquid adding device and the suction manifold; when the liquid adding device is in communication with the mixing agitator, the shut-off valve on the connecting pipeline between the liquid adding device and the suction manifold as well as a shut-off valve on a connecting pipeline between the liquid adding device and the discharge manifold are closed; when the liquid adding device is in communication with the discharge manifold, a shut-off valve on a connecting pipeline between the liquid adding device and the mixing agitator as well as the shut-off valve on the connecting pipeline between the liquid adding device and the suction manifold are closed; and when the liquid adding device is in communication with the suction manifold, the shut-off valve on the connecting pipeline between the liquid adding device and the mixing agitator as well as the shut-off valve on the connecting pipeline between the liquid adding device and the discharge manifold are closed.

8. The fully electric-drive sand mixer, as recited in claim 2, further comprising:

a liquid level gauge which is fixed inside the mixing agitator.

9. The fully electric-drive sand mixer, as recited in claim 7, wherein: a first auxiliary manifold and a second auxiliary manifold are installed and in communication between the suction manifold and the discharge manifold; a first valve is provided on the suction manifold, a second valve is provided on the first auxiliary manifold, a third valve is provided on the second auxiliary manifold, and a fourth valve is provided on the discharge manifold; when the first valve and the fourth valve are opened while the second valve and the third valve are closed, the suction pump cooperates with the suction manifold while the discharge pump cooperates with the discharge manifold; and, when the first valve and the fourth valve are closed while the second valve and the third valve are opened, the suction pump cooperates with the second auxiliary manifold as well as the discharge manifold, and the discharge pump cooperates with the suction manifold as well as the first auxiliary manifold.

10. The fully electric-drive sand mixer, as recited in claim 3, wherein: the foundation is a skid frame or a chassis.

11. An automatic control system for controlling the fully electric-drive sand mixer as recited in claim 3, comprising:

a suction control system which is electrically connected to the suction pump driving motor, wherein the suction control system is configured to control the suction pump driving motor to work;

a mixing control system which is electrically connected to the mixing agitator driving motor through the frequency converter, wherein the mixing control system is configured to control the frequency converter to change a rotating speed of the mixing agitator driving motor, thereby controlling a rotating speed of the mixing agitator;

a dry adding control system which is electrically connected to the dry adding device driving motor through the frequency converter, wherein the dry adding control system is configured to control the frequency converter to change a rotating speed of the dry adding device driving motor, thereby controlling a dry powder additive dosage of the dry adding device;

a liquid adding control system which is electrically connected to the liquid adding device driving motor through the frequency converter, wherein the liquid adding control system is configured to control the frequency converter to change a rotating speed of the liquid adding device driving motor, thereby controlling a liquid additive dosage of the liquid adding device;

a sand conveying control system which is electrically connected to the sand conveying device driving motor through the frequency converter, wherein the sand conveying control system is configured to control the frequency converter to change a rotating speed of the sand conveying device driving motor, thereby changing a proppant input amount of the sand conveying device; and a discharge control system which is electrically connected to the discharge pump, wherein the discharge control system is configured to control the discharge pump.

12. The automatic control system, as recited in claim 11, wherein: the suction control system is directly and electrically connected to the suction pump driving motor; the suction pump driving motor is a non-variable-frequency motor or a variable-frequency motor integrated with the frequency converter; the suction control system maintains the suction pump driving motor at a certain speed, thereby directly controlling a suction volume of the suction pump or controlling the suction volume of the suction pump via the regulating valve.

13. The automatic control system, as recited in claim 12, wherein: the discharge control system is electrically connected to the discharge pump driving motor through the frequency converter, and the discharge control system is configured to control the frequency converter to change a rotating speed of the discharge pump driving motor, thereby controlling a discharge volume and a discharge pressure of the discharge pump.

14. The automatic control system, as recited in claim 12, wherein: the discharge control system is directly and electrically connected to the discharge pump driving motor; the discharge pump driving motor is a non-variable-frequency motor; and the discharge control system is configured to maintain the discharge pump driving motor at a rated speed.

15. The automatic control system, as recited in claim 11, further comprising: a vibration control system which is electrically connected to a vibration motor and is configured to toggle the vibration motor on or off.

* * * * *